United States Patent [19]
Miyata

[11] Patent Number: 5,777,442
[45] Date of Patent: Jul. 7, 1998

[54] CONTROL FOR ELECTRIC POWER ASSISTED VEHICLE

[75] Inventor: Syoichiro Miyata, Iwata, Japan

[73] Assignee: Yamaha Hatsudoki Kabushiki Kaisha, Iwata, Japan

[21] Appl. No.: 790,471

[22] Filed: Jan. 29, 1997

[30] Foreign Application Priority Data

Jan. 29, 1996 [JP] Japan ................................. 8-012973

[51] Int. Cl.⁶ .......................... B62M 1/00; B62M 23/00
[52] U.S. Cl. ........................... 318/2; 180/206; 180/219
[58] Field of Search ........................... 318/1, 2; 180/65.1, 180/65.2, 205, 206, 207, 218, 219, 220, 221; 280/29, 200, 210, 236, 259, 260, 261; 474/69, 70

[56] References Cited

U.S. PATENT DOCUMENTS

| | | |
|---|---|---|
| 4,062,421 | 12/1977 | Weber . |
| 4,221,275 | 9/1980 | Pennebaker et al. . |
| 4,364,448 | 12/1982 | Ikuma . |
| 5,226,501 | 7/1993 | Takata . |
| 5,370,200 | 12/1994 | Takata ........................... 180/206 |
| 5,375,676 | 12/1994 | Takata et al. . |
| 5,474,148 | 12/1995 | Takata . |
| 5,505,277 | 4/1996 | Suganuma et al. ........... 180/206 |
| 5,570,752 | 11/1996 | Takata ........................... 180/206 |
| 5,599,244 | 2/1997 | Ethington ........................ 474/70 |

FOREIGN PATENT DOCUMENTS

| | | |
|---|---|---|
| 569954 | 11/1993 | European Pat. Off. . |
| 590674 | 4/1994 | European Pat. Off. . |

OTHER PUBLICATIONS

Patent Abstracts of Japan, vol. 096, No. 003, 29 Mar. 1996 & JP 07 309283A.
Patent Abstracts of Japan, vol. 095, No. 009, 21 Oct. 1995 & JP 07 143603.
Patent Abstracts of Japan, vol. 095, No. 011, 26 Dec. 26, 1995 & JP 07 196070.

*Primary Examiner*—Bentsu Ro
*Attorney, Agent, or Firm*—Knobbe, Martens, Olson & Bear LLP

[57] ABSTRACT

An electric power assisted vehicle that senses the actual speed that the operator is operating the manual power device and the force applied to that manual power device for controlling the amount of power assist. By comparing the manual force and manual input speeds with predetermined speeds, it is possible to determine whether the vehicle is in a start-up mode or an acceleration mode. Varying degrees of power assist are provided depending upon the operating mode. In addition, the system employs an automatic transmission that is also shifted in response to the sensed condition. Furthermore, the control is capable of sensing the type of battery installed and changing the control in response to the battery installed and also indicating the type of battery installed to the operator.

34 Claims, 7 Drawing Sheets

CONTROL FOR ELECTRIC POWER ASSISTED VEHICLE

BACKGROUND OF THE INVENTION

This invention relates to an electrical power assisted vehicle and more particularly to an improved control system and methodology therefor.

There is a wide variety of types of vehicles which are manually powered. These include bicycles, wheel chairs, water vehicles and other vehicles of a wide variety of types. In connection with these manually powered vehicles, there is an interest in providing electric power which will assist the operator in propelling the vehicle. By utilizing a power assist, it is possible for persons who might not otherwise be able to use these types of vehicles and, thus, obtain exercise benefits. By employing the electric power assist, in addition, the utilization of the vehicles can be greatly expanded.

A wide variety of types of power assist mechanisms have been employed. One very popular type utilizes a sensor which senses the input force exerted by the rider. A power assist is the generated which is proportional to the input force of the operator to assist and still give adequate exercise. Various control strategies are employed, including arrangements where the maximum speed of the vehicle is limited, the power assist is varied in response to certain types of conditions and various other features.

In order to provide many of these results, it is also desirable to provide a sensor which senses vehicle speed. By sensing vehicle speed, it is possible to ensure that the power assist will not cause the vehicle to be operated at a speed that may become unsafe.

For these and other reasons, it is common with many of these assist systems to employ an arrangement wherein speed is sensed in addition the operator input force. However, the provision of an appropriate speed sensor does present some problems.

In vehicles having both manual operation and power assist, there are frequently employed one or more one-way clutches in the various transmissions between the operator power, the assist power and the propulsion device. These one-way clutches are provided so that the vehicle can coast relatively easily without acting as a generator, so that the electric power does not act upon the manual operator and for a variety of other reasons.

Thus, the location of the speed sensor in the transmission mechanism will be determinative of whether the sensor senses actual vehicle speed or some other factor which may or may not be related to either vehicle speed or operator input. The degree of conformity of the sensor output with the actual vehicle speed will depend on the location of the sensor and upon the actual riding condition.

It has been determined that it would be very desirable under many circumstances to employ a sensor which senses the actual input speed generated by the operator rather than actual vehicle speed. By sensing operator speed, the control can be more tailored to the operator demand.

However, there may be some instances where the operator speed and the operator force are not adequate to permit the control to function in the desired manner. For example, at times of vehicle start-up, the load on the operator is quite high and it is desirable to provide a greater amount of power assist than when operating at a higher speed. Hence, under these conditions, actual vehicle speed sensing is important.

That is, a vehicle speed sensor can determine whether the vehicle is in a start-up mode or whether the vehicle has been coasting at a speed and the operator then begins to assert manual force to increase the speed. If the vehicle speed is present or more than a predetermined amount, then the control can readily discriminate between these two different conditions. However, and as noted above, under many circumstances it may be desirable not to utilize a vehicle speed sensor, but rather a sensor that senses another speed which may or may not be the same as vehicle speed.

It is, therefore, a principal object of this invention to provide an improved control for an electric power assisted vehicle wherein the control is based solely upon operator input force and a speed other than vehicle speed.

It is a further object of this invention to provide an electric power assisted vehicle of the type aforenoted wherein the control system is such that it can discriminate between start-up and acceleration from coasting conditions.

Another way of permitting the operator to be able to enjoy a manually powered vehicle without providing undue stresses on the operator is to incorporate a variable ratio transmission between the operator input and the propulsion device. By selecting different speed ratios, either manually or automatically, the operator can enjoy the vehicle without undue stress.

The use of such transmissions and particularly automatic ones has not been employed, insofar as it is known, in conjunction with electric power assisted vehicle. The use of such transmissions can, however, significantly improve the utilization of these vehicles. However, it is desirable to ensure that the power assist features are not compromised or adversely affected by the operation of the transmission.

It is, therefore, as still further object of this invention to provide an improved electric power assisted vehicle having a variable speed transmission and wherein the transmission control is also effected by the power assist control so as to maintain matching performances.

Obviously, with an electric power assisted vehicle, the electric power must come from some source. Generally, these vehicles use batteries for their power source. Various arrangements have been provided so that the batteries can be easily recharged. In many of these types of devices, the battery is readily removable from the vehicle so that it can be moved to a place where it can be conveniently charged.

Where the battery is removable, however, there becomes a possibility that different types of batteries having different characteristics can be substituted for use in the same vehicle. Thus, a control that is designed for one type of battery may not provide proper performance if a different type of battery is substituted.

It is, therefore, a still further object of this invention to provide an improved electric power assisted vehicle having a removal battery in an arrangement wherein the control will be responsive to the type of battery employed.

It is a further object of this invention to provide improved electric power assisted vehicle having a removable battery and wherein the system gives an indication to the operator of the type of battery which is in place.

SUMMARY OF THE INVENTION

First features of the invention are adapted to be embodied in an electric power assist system and method for a manually powered vehicle. The vehicle provides a rider's position in which a rider may be positioned. A propulsion device is provided for propelling the vehicle. A manual power operator is mounted for rotation and is adapted to receive a manual input force from the rider. A transmission is provided

3 for transmitting rotation of the manual power operator into a driving force the propulsion device. An electric motor is provided for also driving the propulsion device. A speed sensor is provided for directly sensing the speed of rotation of the manual power operator and a force sensor is provided for sensing the manual force applied by the rider to the manual power operator.

In accordance with a system for practicing the invention, a control is provided for controlling the operator of the electric motor in response to the outputs of both the force sensor and the speed sensor.

In accordance with a method for practicing the invention, the amount of electric power assist is varied in response to the sensed force and sensed speed.

In furtherance of the aforenoted features of the invention, the force applied is compared with a predetermined force and the operator speed is compared with a predetermined speed to determine whether the vehicle is in a start-up or an acceleration mode for changing the amount of electric power assist, depending upon which operational mode is being encountered.

In accordance with another feature of the invention, the transmission is capable of providing a varying speed ratio between the input and the propulsion device and that speed ratio is adjusted automatically in response to the outputs of the force sensor and the speed sensor.

A further feature of the invention is adapted to be embodied also in an electric power assist system for a manually powered vehicle. The vehicle has a rider's position where a rider can be positioned in the vehicle and a propulsion device for propelling the vehicle. A manual power operator is mounted to receive a manual input force for the rider. This manual input force is transmitted by a transmission into operator of the propulsion device for driving the propulsion device and the vehicle. An electric motor is also provided for driving the propulsion device. A control receives certain input signals for controlling the operation of the electric motor to provide the electric power assist. The electric motor receives power from a removable battery. This control includes a device which senses the type of battery employed and provides at least one of a variation in the control or an indication to the rider in response to the type of battery that is in place.

4

DETAILED DESCRIPTION OF THE PREFERRED EMBODIMENTS OF THE INVENTION

Figure 1:
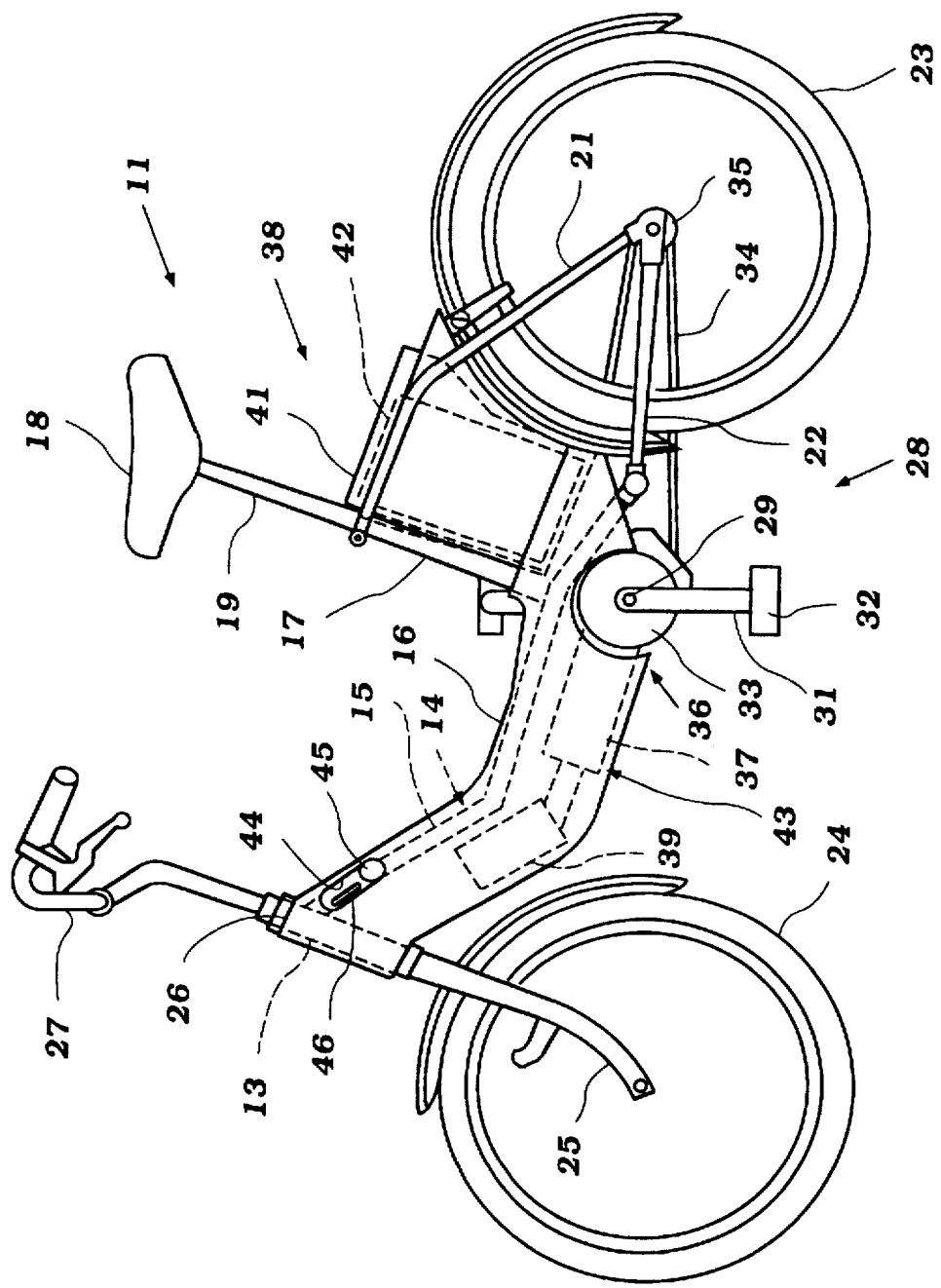
FIG. 1 is a side elevational view of an electric power assisted bicycle constructed and operated in accordance with an embodiment of the invention.

Referring now in detail to the drawings and initially to FIG. 1, an electric power assisted vehicle is shown in FIG. 1 and is identified generally by the reference numeral 11. The illustrated vehicle 11 comprises a bicycle. Although this type of vehicle has been illustrated and will be described, it will be readily apparent to those skilled in the art how the invention can be applied with various types of electric power assisted, manually operated vehicles. A bicycle is just one of many types of vehicles with which certain facets of the invention may be utilized. The invention, however, does have particular utility in conjunction with electric power assisted bicycles.

The construction of the bicycle 11 will be described only generally inasmuch as the invention deals primarily with the control strategy and sensor arrangement for the bicycle 11. Where any details of the construction of the bicycle 11 are not illustrated or described, reference may be had to U.S. Pat. No. 5,570,752 issued Nov. 5, 1996 in the name of Nozomo Takata, entitled "Transmission Arrangement for Electric Power Assisted Bicycle," assigned to the assignee hereof. Also, reference may be had to other prior art structures for certain details of the bicycle 11 where those details are not shown because they are not critical to the practicing of the invention.

The bicycle 11 is comprised of a frame assembly, indicated generally by the reference numeral 12, which is comprised of a head pipe 13, a main tube 14 having a first portion 15 that extends rearwardly and downwardly from the head pipe 13 and a more horizontally-extending but still downwardly inclined rear portion 16. A seat post 17 is affixed to the rearwardly extending portion 16 of the main tube 14. A seat 18 is adjustably supported on the seat post 17 by means of a connecting pipe 19.

The frame further includes a rear wheel support consisting of a back stay 21 and a rear fork 22. A rear wheel 23 is rotatably journaled by the back stay 21 and fork 22 at the rear thereof A front wheel 24 is dirigibly supported by a front fork 25 and bearing assembly 26 carried by the head pipe 23. A handlebar 27 is disposed adjustably to the front fork 25 forwardly of the seat 18 for steering of the front wheel 24 in a known manner.

At the base of the seat post 17, there is provided a manual power input mechanism in the form of a pedal operated crank, indicated generally by the reference numeral 28. This pedal operated crank includes a crankshaft 29 that is pivotally supported on the frame assembly 12 in a suitable manner, for example, as disclosed in the aforenoted U.S. Pat. No. 5,570,752. The pedal mechanism 28 includes crank arms 31 that are fixed to the opposite ends of the crankshaft 29 and which pivotally carry pedals 32 at their outer extremities so as to permit the rider's feet to turn the crankshaft 29 in a well-known manner.

A transmission mechanism, shown partially and indicated by the reference numeral 33 of an automatic type drives a chain 34. The chain 34, in turn, drives a sprocket 35 for driving the rear wheel 23 in a well-known manner. The automatic transmission 33 may be of either a continuously variable or a step-type and which operates to vary the transmission speed automatically. This type of automatic transmission is known in various types of manually operated bicycles. However, in accordance with another feature of the invention, the automatic transmission is also shifted in response to power assist conditions, as will become apparent.

In addition to the manual power mechanism 28 there is provided an electric power assist mechanism, indicated generally by the reference numeral 36. This electric power assist mechanism includes an electric motor 37 which drives the transmission 33 through a one-way clutch mechanism which may be of the type also shown in the aforenoted U.S. Pat. No. 5,570,752.

This electric motor 38 is supplied with electrical power from an electrical power source, indicated generally by the reference numeral 38 under the operation of a controller, shown schematically and indicated at 39. The control strategy will be described later.

The electrical power source includes a battery case 41 which contains an electrical storage battery 42, preferably of the rechargeable type. The battery 42 may be either charged in the bicycle 11 or may be removed for external charging.

A body, indicated generally at 43 encircles a portion of the frame assembly 12. In a recess 44 provided in the forward portion of the body 43 there is an external switching arrangement provided for controlling the application of electrical power from the battery 42 to the controller 39 and also for switching the controller 39 on or off. This includes a main switch 45 and also a receptor 46. The receptor 46 can receive a magnetic card which serves as a key and also which may contain information as to the preferred operating characteristics of the particular rider. That is, the control 39 may be tuned so as to provide slightly different types of control or techniques within the parameters which will hereinafter be described. These techniques can be fine-tuned to suit particular riding styles or requirements of individual riders.

The control arrangement will now be described by particular reference to FIGS. 2 and 3. These figures show also how the circuitry of the control is designed so as to sense the type of battery being utilized and to make appropriate adjustments in the control to suit the particular battery type. Also an indication of the battery type is given to the rider.

Figure 2:
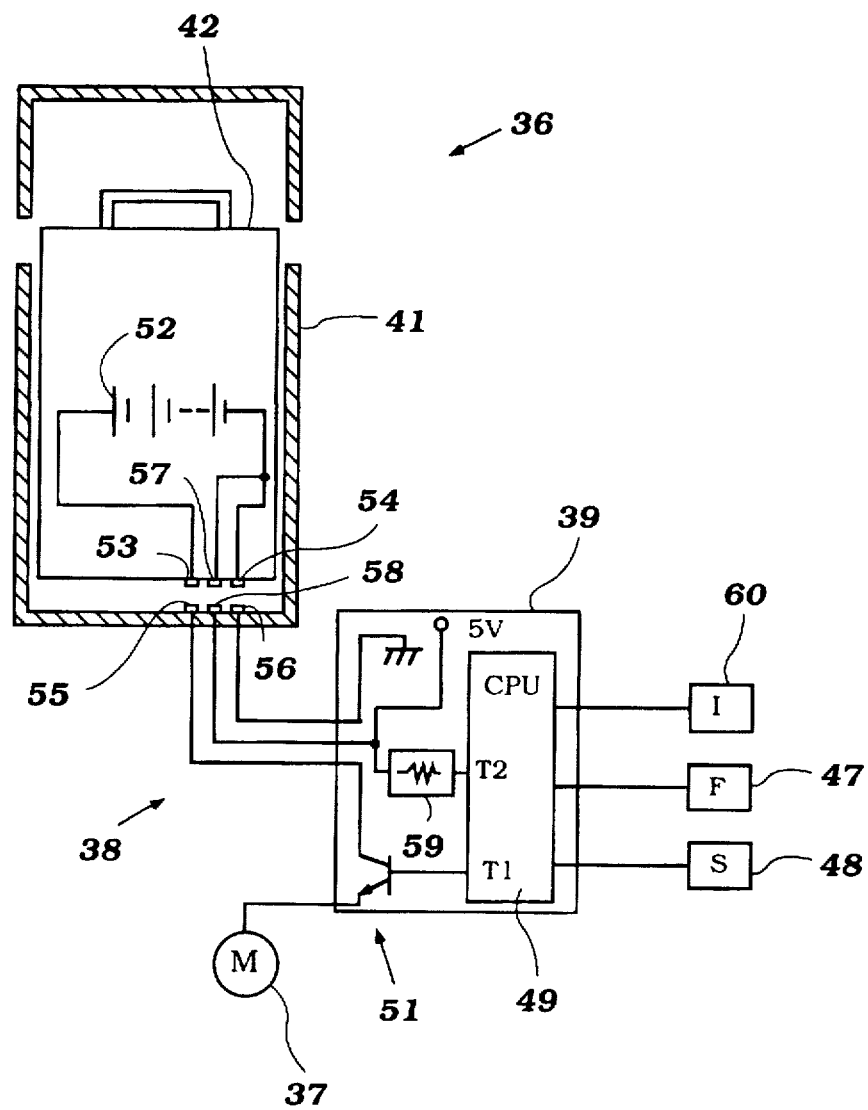
FIG. 2 is a partially schematic cross-sectional view taken through the battery case and showing the interrelated circuitry for control and also utilized to determine the type of battery employed and showing one type of battery in place.
Figure 3:
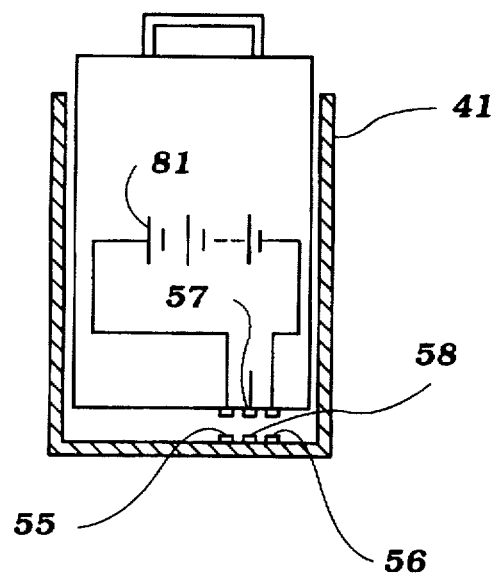
FIG. 3 is a partial view showing only the cross-sectional portion of the battery case similar to FIG. 2 but illustrating when a different type of battery is installed.

The control arrangement is shown schematically in FIG. 2 and includes in addition to those components already described, two sensors. These sensors comprise a force or torque sensor, indicated generally by the reference numeral 47 and which functions to sense the actual force applied by the rider on the manual operating mechanism 28. A torque sensor of the type shown in aforenoted U.S. Pat. No. 5,570,752 may be employed for sensing and measuring this operator input torque. Because of the fact that the pedal mechanism is a crank mechanism, the force which the operator applies to the pedal will vary cyclically in a sine wave-type fashion, even if the operator is pedaling with the same force as is well known.

In addition to the force sensor 47, there is also provided in the pedal mechanism a speed sensor, indicated by the reference numeral 48. Unlike the prior art type of constructions, however, the speed sensor 48 is associated directly with the crankshaft 29 so it measures the actual speed of rotation of the crankshaft 29 rather than the speed of rotation of one of the wheels 23 or 24 or some other component in the transmission mechanism which may not necessarily indicate the actual vehicle speed. Certain facets of the invention, however, may be used in transmissions utilizing sensors that sense the rotational speed of other components of the transmission. Some of these facets have particular utility where the speed sensor does not always sense actual vehicle speed.

The outputs from the sensors 47 and 48 are transmitted to a CPU 49 which operates in a control strategy as will be described so as to control the supply of electric power from the battery 42 to the motor 37. This supply is controlled by means that include a transistor 51 which is switched by the CPU 49 to vary the duty cycle of the motor 37 and thus vary the amount of power assist.

Referring now specifically to the battery case 41 and its association with the battery 42, FIG. 2 shows an arrangement that utilizes a nickel cadmium battery, indicated by the reference numeral 52, which includes a plurality of battery cells in series. These battery cells are connected to a positive terminal 53 and a negative terminal 54.

The battery case 41 has mating terminals 55 and 56 which connect the battery 42, when installed in the case 41 to the circuitry shown in FIG. 2. The terminal 56 is grounded as is the motor 37 while the terminal 55 is connected through the transistor 51 to the motor winding.

In addition, the battery is provided with an indicator terminal 57 that cooperates with an indicator terminal 58 of the battery case 41. This terminal is connected through a resistor and detector circuit 59 to the CPU 49. With a nickel cadmium battery, the terminal 57 is also grounded and hence when the battery 42 is placed in the case 41, there will be a voltage such as five volts exerted which will be sensed by the detector circuit 59 and adjust the control of the CPU 49 accordingly. In addition, an indicator light 60 may be provided in an area to be seen by the rider so that he can determine the type of battery which has been installed.

A five-volt reference signal is also transmitted to the resistor 59. Thus, when the nickel cadmium battery as shown in FIG. 2 is in place, this voltage will be grounded and the CPU will not see a voltage. However, when a conventional battery as shown in FIG. 3 and indicated by the reference numeral 81 is applied, its reference terminal 57 is not connected to either the positive or negative side of the battery. As a result, there will be a 5 volt signal sent when this type of battery is installed in the battery case 41 and such an indication will be given.

By making this determination, the CPU 49 also may be programmed to provide the desired type of assist power depending upon the battery type which is installed.

The basic control routine for the power assist of the bicycle 11 may be of any type known in the art so as to provide either a fixed or a variable power assist during vehicle operation. However in accordance with an embodiment of the invention, since the sensor for speed 48 operates on the crankshaft 29 rather than for vehicle speed, the system in accordance with a feature of the invention includes a discriminating device so as to discriminate whether the vehicle is being started from a standstill or if the vehicle is being coasted and the rider then desires to accelerate without needing to measure actual vehicle speed.

Generally, it is desirable to provide a large power assist ratio during startup to make the starting easier. However, this amount of power assist may be gradually diminished as the vehicle speed increases to ensure against over speed conditions.

If, however, the rider is coasting and then begins to pedal to accelerate and increase the speed of the bicycle 11, if the control operates in the startup mode, too much power assist might be generated and an over speed condition might exist. Therefore, in accordance with an important feature of the invention, the system operates in such a way as to discriminate from the crankshaft speed sensor 48 and the force sensor 47 whether operator is starting the bicycle 11 from rest or is merely accelerating from a coasting condition. This feature may be utilized with any system where the speed sensor does not actually measure vehicle speed but senses the speed of a transmission component that does not always reflect actual vehicle speed.

Figure 4:
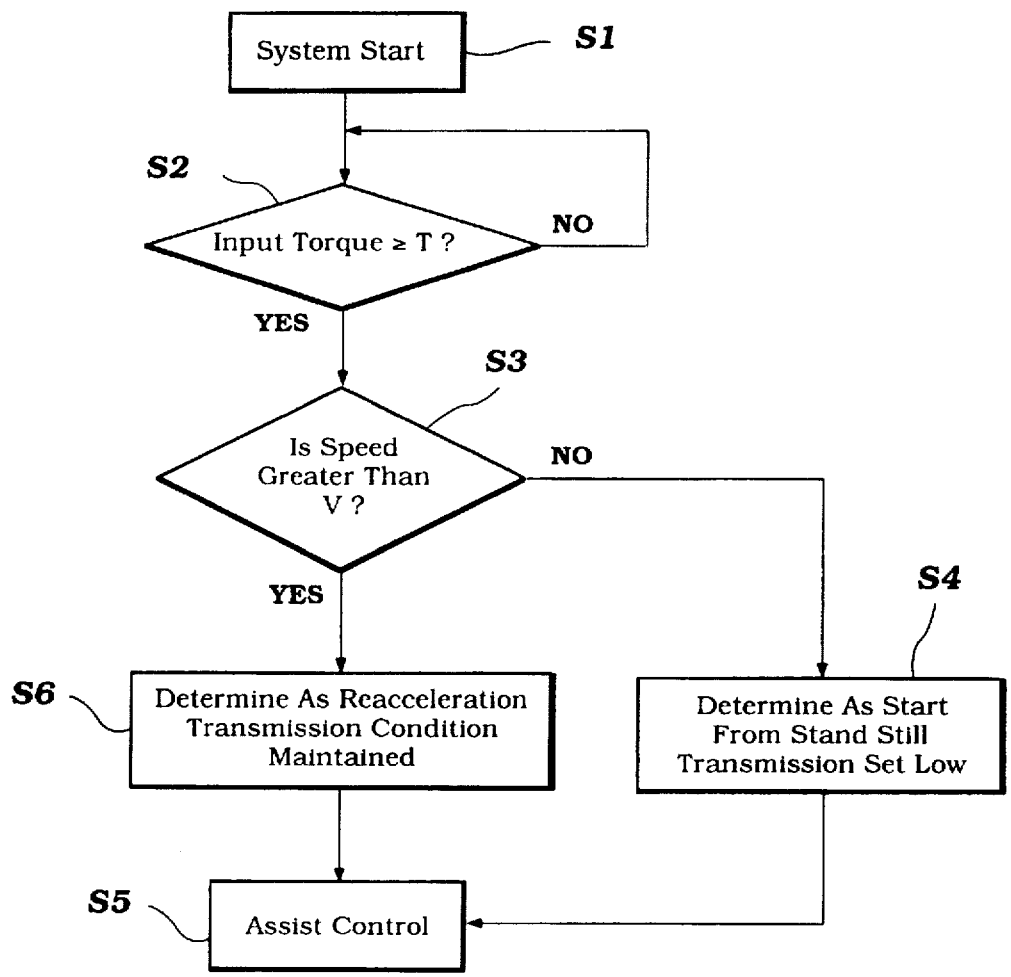
FIG. 4 is a block diagram showing a portion of the control routine in accordance with the invention.
Figure 5:
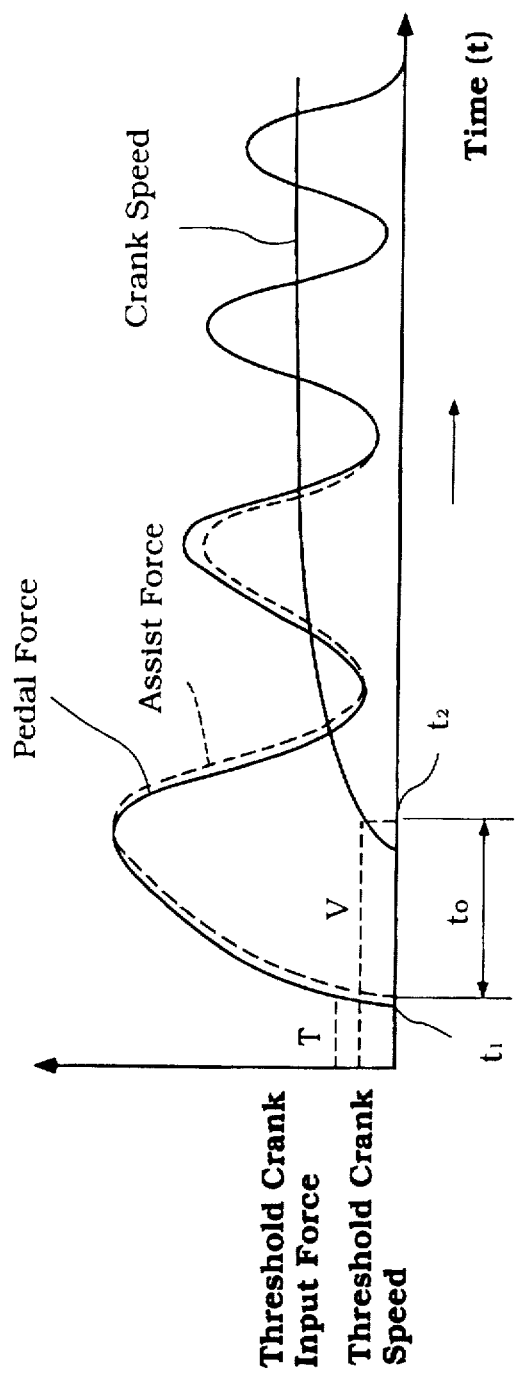
FIG. 5 is a graphical view showing the pedal force and crank speed during a startup operation.
Figure 6:
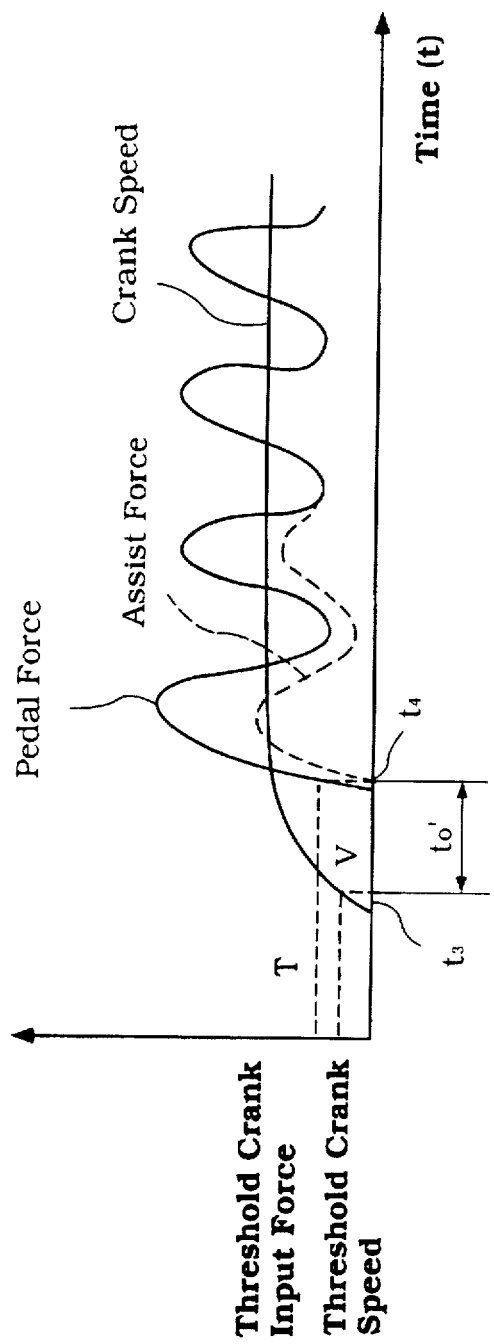
FIG. 6 is a graphical view, in part similar to FIG. 5, but shows the pedal torque and crank speed when going through a resumption to pedaling or acceleration after a coasting period.

This control routine is shown in FIG. 4 and will be described by reference to that figure. However, before referring to that figure, FIGS. 5 and 6 will be described. FIGS. 5 and 6 show two pedaling conditions. FIG. 5 indicates the position when the operator is starting the bicycle 11 from standing while FIG. 6 indicates a condition when the bicycle has been coasting at speed and then the operator desires to accelerate the vehicle 11.

As may be seen in FIG. 5, there is a greater pedal force exerted under both startup and acceleration modes but the force is greater when starting from standstill. However, it is not desirable to utilize a high threshold force as the way of determining that the vehicle is in a startup mode. If this were done, then the power assist would be delayed significantly during startup from standstill and the desired amount of power assist would come on too late. Thus, relatively low thresholds are set for crankshaft speed and for pedal force in order to make this discrimination in accordance with the invention.

The control routine will now be described by reference to FIG. 4. The program starts at the step S1 when the main switch 45 is turned on. The program then moves to the step S2 to compare the actual torque signal output by the torque sensor 47 with the threshold value T. If the input torque sensed by the torque sensor is not equal to or greater than this value, the program repeats.

If, however, at the step S2 it is determined that the input torque value T has been exceeded, then the program moves to the step S3. At the step S3, the speed of the crank shaft 29 is measured to determine if it is greater than the threshold speed V. If it is not, then the program moves to the step S4 wherein the condition is determined as a starting condition starting the bicycle 11 from a standstill. At the same time, the automatic transmission or variable speed transmission, as aforenoted, is set to a low condition wherein there is a high assist accomplished by the gear train.

The program then move to the step S5 so as to initiate the electric power assist at the normal, relatively high assist ratio. This normal assist ratio is shown for the purpose of description as an assist force equal to the measured input pedal force.

If, however, at the step S3 it is determined that the speed is greater than the threshold speed V, then the program moves to the step S6 so that the CPU 49 makes a determination that there is an acceleration from speed condition. When this happens and also at the step S6, the state of the automatic transmission is not changed. That is, the condition of the transmission is left at the state or ratio during which the coasting operation was taking place.

Figure 7:
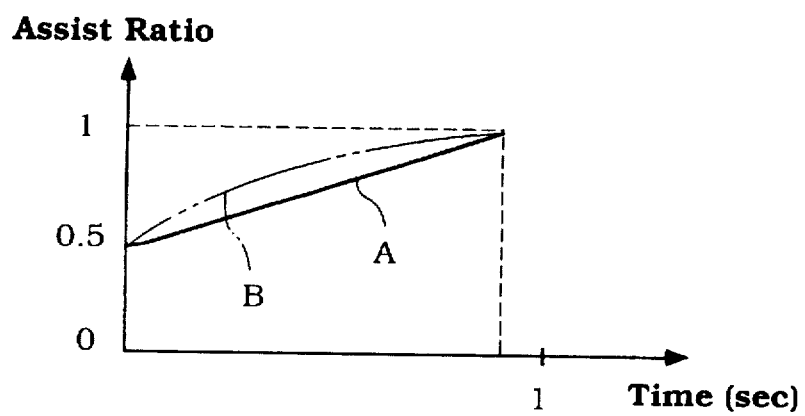
FIG. 7 is a graphical view showing how the assist ratio varies with time in accordance with the invention.

The program then moves to the step S5 so as to apply an assist power which is reduced from the normal assist power. As seen in FIG. 7, the assist ratio may be set as a linear function shown by the curve A that starts at one-half normal assist ratio and then gradually builds up to conventional assist ratio at a time interval which may be timed something slightly less than one second. Alternatively, rather than utilizing a linear buildup, a curvilinear build-up may be used as shown by the curve B. Various other shaped curves can be employed.

In this way, when the power assist comes on, it will not come on a great and thus, it will not be a sudden surge of speed. The practical effect of this operation will now be described by reference to FIGS. 5 and 6 and initially to FIG. 5 which shows the initial startup of the bicycle 11 from rest. As may be seen, the rider exerts a buildup of pressure on the crankshaft 29 by applying force to the pedals 32, which, as has been noted, varies cyclically due to the relationship of the crank arm 31.

However, there must be more than a predetermined force that is exerted before the crank will begin to turn due to the inertia to the bicycle 11. Thus, the threshold crank torque or force T will be exceeded at the time t1 and before the crankshaft 29 actually begins to rotate. Hence, at the time t1, the program, in accordance to the routine of FIG. 4, immediately applies the full assist force at the unitary ratio with the manual force as shown by the dotted line view of FIG. 5. Hence, the operator will not need to apply as much force to begin the rotation of the crankshaft 29 and the crankshaft threshold speed V will be reached at a relatively short time period t2 as seen in FIG. 5 after a time delay To. This coupled with the fact that the automatic transmission has shifted into a low ratio will provide relatively easy acceleration to the desired riding speed.

Consider now the condition of FIG. 6 where the bicycle has been operating at a certain speed and the rider has in effect been coasting. If the rider wishes to accelerate to increase the speed, he begins pedaling and rotating the pedals. However, until the speed of the crankshaft 29 reaches the corresponding speed of the bicycle, there will be really no significant force required. Hence, when the crankshaft speed reaches the speed V at the time $T_3$, no assist force will be supplied. This is because the torque level T has not yet been exerted and hence the program will have continuously repeated previously between the steps S1 and S2 as seen in FIG. 4.

However, once the threshold torque T is exceeded at the time $T_4$ after a relatively short time delay $To^1$ the power assist will cut in. However, this may occur before the crank speed has reached the actual vehicle speed. Nevertheless, the assist ratio will be relatively low as noted, and hence, the sudden application of power will not cause uneven riding or feeling of discomfort to the rider.

With both riding loads, the assist ratio is maintained at one until the vehicle speed reaches a speed such as approximately 15 km. per hour. Then the assist ratio is gradually decreased either in a linear or step function up that reaches zero at a predetermined maximum speed, for example 24 km. per hour.

Thus, from the foregoing description it should be readily apparent that the described construction provides a very good assist control for an electrically operated vehicle wherein the vehicle speed need not be actually sensed, but rather the crank speed of the manual at force application can be sensed. This system easily discriminates between starting and acceleration from speed and thus provides good assist for starting and smooth assist when transitioning from coasting to acceleration. In addition, the automatic transmission control mechanism further augments the power assist and improves the bicycle performance.

Of course, the foregoing description is that of preferred embodiments of the invention, and various changes and modifications may be made without departing from the spirit and scope of the invention, as defined by the appended claims.

What is claimed is:

1. An electric power assist system for a manually powered vehicle, said vehicle providing a rider's position for receiving a rider, a propulsion device for propelling said vehicle, a manual power operator mounted for rotation and adapted to receive a manual input force from a rider, a transmission for transmitting rotation of said manual power operator into a driving force for said propulsion device, an electric motor for driving said propulsion device, a speed sensor for directly sensing the speed of rotation of said manual power operator under all running conditions a force sensor for sensing the manual force applied by the rider to said manual power operator, and a control for controlling the operation of said electric motor in response to the output of said sensors.

2. An electric power assist system as set forth in claim 1, further including a one-way clutch in the transmission and wherein the manual power operator speed sensor is disposed between the manual power operator and the one-way clutch.

3. An electric power assist system as set forth in claim 2, wherein the transmission of power from the electric motor to the propulsion device is also through a one-way clutch.

4. An electric power assist system as set forth in claim 1, wherein the manual power operator comprises a crankshaft driven by a pedal mechanism.

5. An electric power assist system as set forth in claim 1, wherein the speed sensor is directly associated with the crankshaft and reads the actual rotational speed of the crankshaft.

6. An electric power assist system as set forth in claim 1, wherein the control senses whether the output of the speed sensor is equal to or above a predetermined value and whether the force sensor senses a force equal to or greater than a predetermined value in order to provide different assist ratios.

7. An electric power assist system as set forth in claim 6, wherein the vehicle is determined by the control to be in an initial start up mode if the force sensor senses a force equal to or greater than a predetermined force before the speed is sensed to be equal to or greater than a predetermined speed and the vehicle is determined by the control to be in an acceleration from speed mode if the speed is sensed to be equal to or greater than a predetermined speed before the force sensor senses a force equal to or greater than a predetermined force.

8. An electric power assist system as set forth in claim 7, wherein the start up assist ratio is greater than the acceleration assist ratio.

9. An electric power assist system as set forth in claim 8, wherein the acceleration assist ratio merges into the start up assist ratio with time.

10. An electric power assist system as set forth in claim 8, wherein the merger is nonlinear.

11. An electric power assist system as set forth in claim 7, wherein the transmission provides varying speed ratios and the control also controls the transmission in response to the output of the sensors.

12. An electric power assist system as set forth in claim 11, wherein the transmission provides a lower speed ratio if a start up condition is determined and no change in ratio if an acceleration from speed is determined.

13. An electric power assist system as set forth in claim 6, wherein the vehicle is provided with a removable battery for powering the electric motor and the control also senses the type of battery and provides one of a variation in the control and an indicator to the operator of the type of battery installed.

14. An electric power assist system as set forth in claim 13, wherein the control provides a variation in the control.

15. An electric power assist system as set forth in claim 13, wherein the control provides an indicator to the operator of the type of battery installed.

16. An electric power assist system for a manually powered vehicle, said vehicle providing a rider's position for receiving a rider, a propulsion device for propelling said vehicle, a manual power operator mounted for rotation and adapted to receive a manual input force from a rider, a transmission for transmitting rotation of said manual power operator into a driving force for said propulsion device, an electric motor for driving said propulsion device, a speed sensor for directly sensing the speed of rotation of said manual power operator, a force sensor for sensing the manual force applied by the rider to said manual power operator, a removable battery for powering said electric motor, a control for controlling the operation of said electric motor in response to the output of said sensors, said control also sensing the type of battery and providing one of a variation in the control and an indicator to the operator of the type of battery installed.

17. An electric power assist system as set forth in claim 16, wherein the control provides a variation in the control.

18. An electric power assist system as set forth in claim 16, wherein the control provides an indicator to the operator of the type of battery installed.

19. An electric power assist system for a manually powered vehicle, said vehicle providing a rider's position for receiving a rider, a propulsion device for propelling said vehicle, a manual power operator mounted for rotation and adapted to receive a manual input force from a rider, a transmission for transmitting rotation of said manual power operator into a driving force for said propulsion device, said transmission providing varying speed ratios, an electric motor for driving said propulsion device, a speed sensor for directly sensing the speed of rotation of said manual power operator, a force sensor for sensing the manual force applied by the rider to said manual power operator, and a control for controlling the operation of said electric motor and the ratio of the transmission in response to the output of the sensors.

20. An electric power assist and transmission for a manually powered vehicle, said vehicle providing a rider's position for receiving a rider, a propulsion device for propelling said vehicle, a manual power operator mounted for rotation and adapted to receive a manual input force from a rider, a change ratio transmission for transmitting rotation of said manual power operator into a driving force for said propulsion device, an electric motor for driving said propulsion device, a speed sensor for sensing speed, a force sensor for sensing the manual force applied by the rider to said manual power operator, and a control for controlling the operation of said electric motor and the ratio of said transmission in response to the output of said sensors.

21. An electric power assist and transmission as set forth in claim 20, wherein the control senses whether the output of the speed sensor is equal to or above a predetermined value and whether the force sensor senses a force equal to or greater than a predetermined value in order to provide different electric assist ratios.

22. An electric power assist and transmission as set forth in claim 21, wherein the vehicle is determined by the control to be in an initial start up mode if the force sensor senses a force equal to or greater than a predetermined force before the speed is sensed to be equal to or greater than a predetermined speed and the vehicle is determined by the control to be in an acceleration from speed mode if the speed is sensed to be equal to or greater than a predetermined speed before the force sensor senses a force equal to or greater than a predetermined force.

23. An electric power assist and transmission as set forth in claim 22, wherein the transmission provides a lower speed ratio if a start up condition is determined and no change in ratio if an acceleration from speed is determined.

24. An electric power assist system for a manually power vehicle, said vehicle providing a rider's position for receiving a rider, a propulsion device for propelling said vehicle, a manual power operator mounted for rotation and adapted to receive a manual input force from a rider, a transmission for transmitting rotation of said manual power operator into a driving force for said propulsion device, an electric motor for driving said propulsion device, a speed sensor for sensing the speed of rotation of a component in said transmission that is not the same as the speed of said vehicle under all operating conditions of said vehicle, a force sensor for sensing the manual force applied by the rider to said manual power operator, a control for controlling the operator of said electric motor in response to the output of said sensors, and means in said control for determining only from the outputs from said sensors whether said vehicle is in an initial start up mode or be in an acceleration from speed mode.

25. An electric power assist system as set for in claim 24, wherein the control provides different assist ratios depending upon the determined vehicle mode.

26. An electric power assist system as set for in claim 25, wherein the vehicle is determined by the control to be in an initial start up mode if the force sensor senses a force equal to or greater than a predetermined force before the speed is sensed to be equal to or greater than a predetermined speed and the vehicle is determined by the control to be in an acceleration from speed mode if the speed is sensed to be equal to or greater than a predetermined speed before the force sensor senses a force equal to or greater than a predetermined force.

27. An electric power assist system as set for in claim 26, wherein the start up assist ratio is greater than the acceleration assist ratio.

28. An electric power assist system as set for in claim 27, wherein the acceleration assist ratio merges into the start up assist ratio with time.

29. An electric power assist system as set forth in claim 27, wherein the transmission provides varying speed ratios and the control also controls the transmission in response to the output of the sensors.

30. An electric power assist system as set forth in claim 29, wherein the transmission provides a lower speed ratio if a start up condition is determined and no change in ratio if an acceleration from speed is determined.

31. An electric power assist system for a manually power vehicle, said vehicle providing a rider's position for receiving a rider, a propulsion device for propelling said vehicle, a manual power operator adapted to receive a manual input force from a rider, a transmission for transmitting manual power operator operation into a driving force for said propulsion device, an electric motor for driving said propulsion device, a control for controlling the operation of said electric motor for controlling the amount of electric power assist, a removable battery for supplying electric power to said electric motor through said control, and means for sensing the type of electric battery and providing one of a variation in the control and an indicator to the operator of the type of battery installed.

32. An electric power assist system as set forth in claim 31, wherein the control provides a variation in the control.

33. An electric power assist system as set forth in claim 31, wherein the control provides an indicator to the operator of the type of battery installed.

34. An electric power assist system as set forth in claim 33, wherein the control also provides a variation in the control.

* * * * *